US011657610B2

(12) United States Patent
Nagano

(10) Patent No.: US 11,657,610 B2
(45) Date of Patent: May 23, 2023

(54) I/O SIGNAL INFORMATION DISPLAY SYSTEM

(71) Applicant: FANUC CORPORATION, Yamanashi (JP)

(72) Inventor: Keisuke Nagano, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/108,077

(22) Filed: Dec. 1, 2020

(65) Prior Publication Data

US 2021/0201033 A1   Jul. 1, 2021

(30) Foreign Application Priority Data

Dec. 26, 2019   (JP) ............................. JP2019-236354

(51) Int. Cl.
*G06V 20/20*   (2022.01)
*G06T 1/00*   (2006.01)
*G09G 5/377*   (2006.01)

(52) U.S. Cl.
CPC ............ *G06V 20/20* (2022.01); *G06T 1/0014* (2013.01); *G09G 5/377* (2013.01)

(58) Field of Classification Search
CPC .............. G06K 9/00671; G06T 1/0014; G06T 2207/10004; G06T 2207/30164; G06T 19/006; G09G 5/377; G02B 27/0172; G02B 27/017; G02B 2027/0141; G02B 2027/0138; G02B 2027/014; G06F 3/011; G06F 3/017; A01J 7/04
See application file for complete search history.

(56) References Cited

U.S. PATENT DOCUMENTS

| | | | | |
|---|---|---|---|---|
| 9,846,933 B2* | 12/2017 | Yuksel | ............... | G01N 21/9515 |
| 10,838,211 B2* | 11/2020 | Nishi | ................. | G02B 27/0172 |
| 10,885,622 B2* | 1/2021 | Subramanian | .......... | G06F 30/17 |
| 11,024,263 B2* | 6/2021 | Chhipa | ................... | G06F 3/147 |
| 2014/0189415 A1* | 7/2014 | Chen | ........................ | G06F 1/08 |
| | | | | 713/600 |
| 2015/0092961 A1* | 4/2015 | Okabayashi | ........... | H04H 60/04 |
| | | | | 381/119 |
| 2017/0136697 A1* | 5/2017 | Kia | ........................ | B33Y 10/00 |
| 2018/0307045 A1* | 10/2018 | Nishi | .................... | G02B 27/017 |
| 2018/0339456 A1* | 11/2018 | Czinger | ................. | B33Y 10/00 |
| 2021/0053227 A1* | 2/2021 | Wartenberg | ............ | B25J 9/1653 |
| 2021/0201033 A1* | 7/2021 | Nagano | ................. | G06T 1/0014 |

FOREIGN PATENT DOCUMENTS

| | | |
|---|---|---|
| JP | H10-105219 A | 4/1998 |
| JP | 2018-181232 A | 11/2018 |

* cited by examiner

*Primary Examiner* — Abderrahim Merouan
(74) *Attorney, Agent, or Firm* — Studebaker & Brackett PC

(57) ABSTRACT

To provide an I/O signal information system in which a monitoring target portion and I/O signal information are automatically associated with each other and displayed on a display screen when monitoring a facility including a robot. An object identification unit identifies an object based on a correlation between a change of an actual photographed image displayed on a display device by actual photographed data supplied from an imaging device and a change of I/O signal information, and a display control unit causes the display device to display an augmented reality image in a display form in which an image of the I/O signal information has a specific relationship with an image of the object identified.

6 Claims, 6 Drawing Sheets

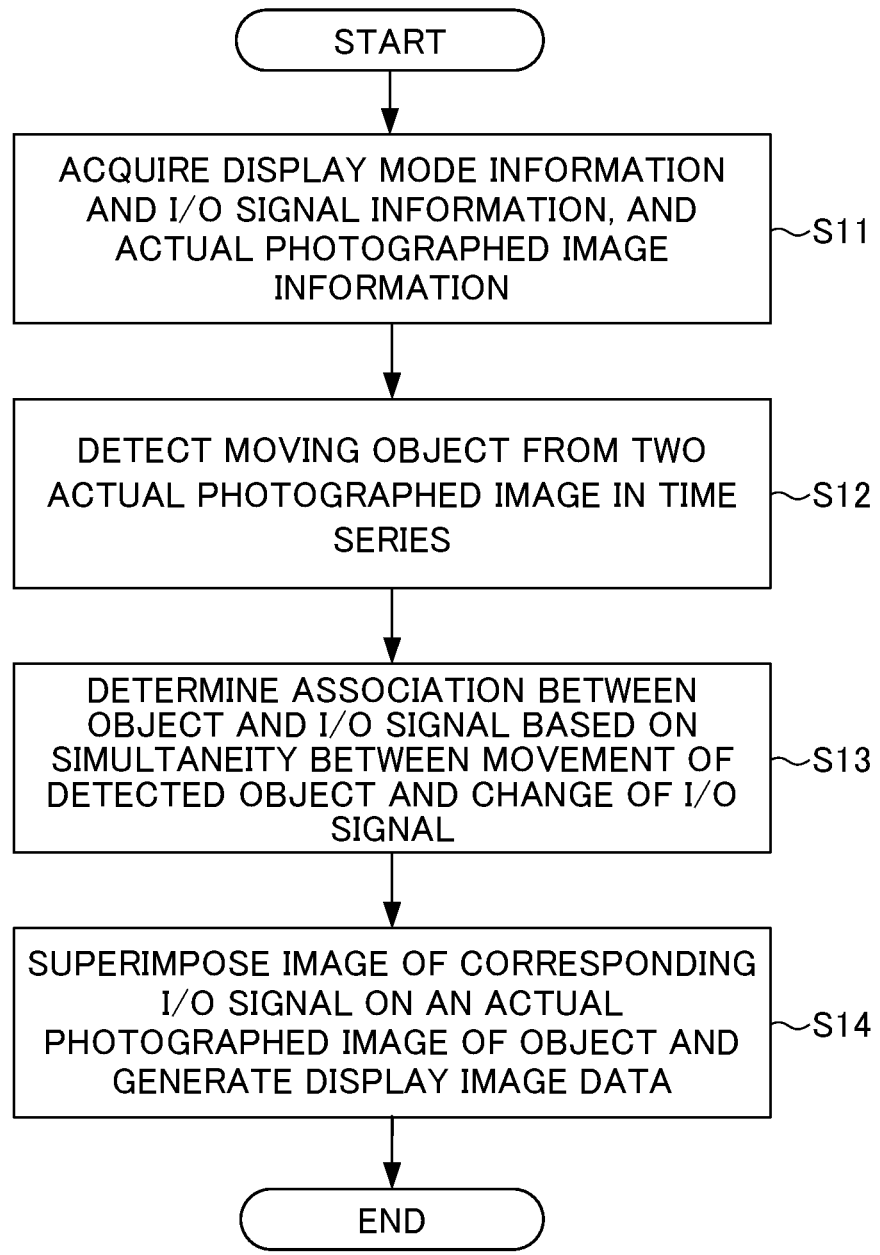

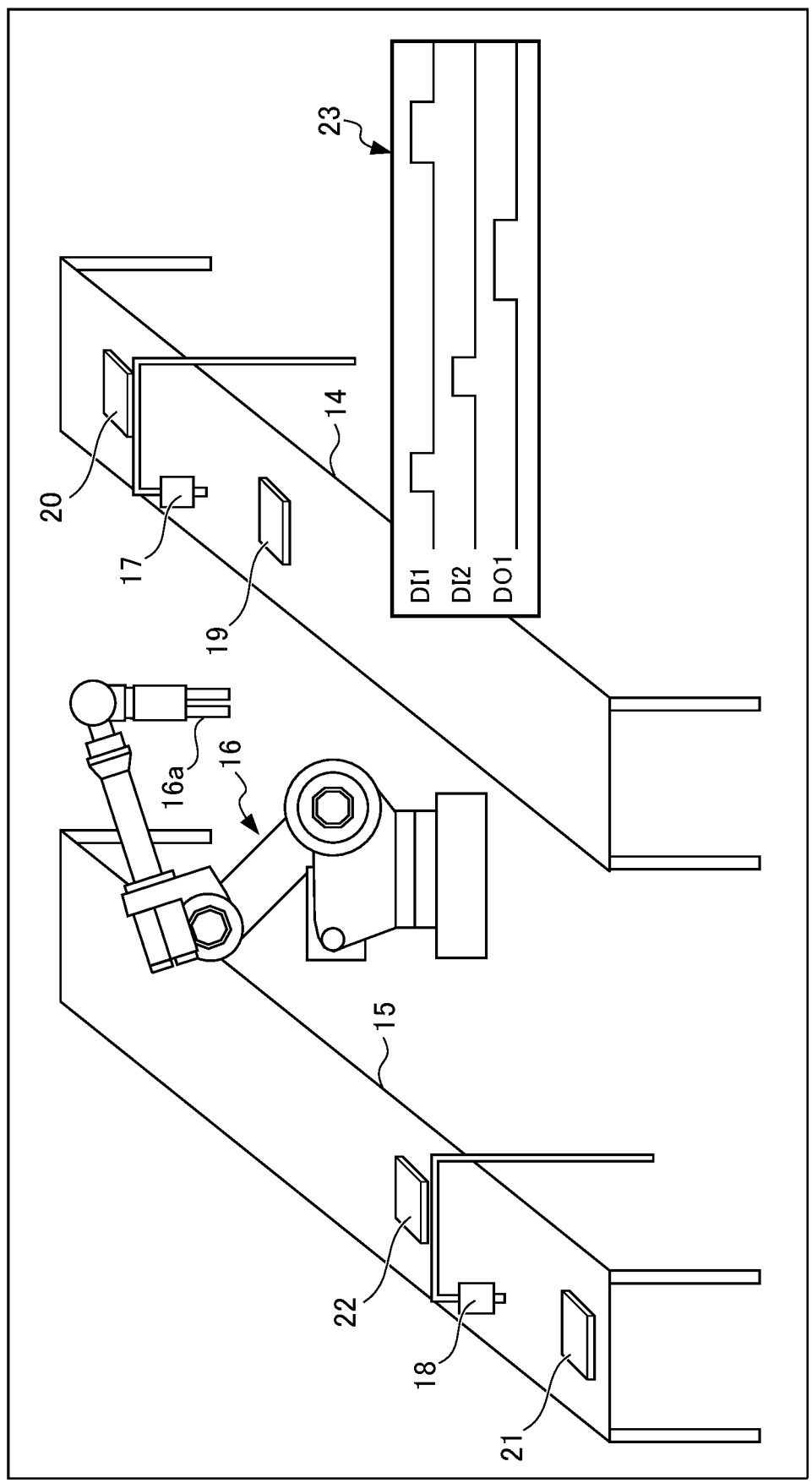

I/O SIGNAL INFORMATION DISPLAY SYSTEM

This application is based on and claims the benefit of priority from Japanese Patent Application No. 2019-236354, filed on 26 Dec. 2019, the content of which is incorporated herein by reference.

BACKGROUND OF THE INVENTION

Field of the Invention

The present invention relates to an I/O signal information display system.

Related Art

A system has been proposed in which, while a production facility is displayed on a display device in a three-dimensional graphic, a specific portion of the production facility is surrounded by a line drawn by a mouse so that only I/O data of the specific portion can be displayed on the display device (for example, refer to Japanese Unexamined Patent Application, Publication No. H10-105219). A maintenance support system has been proposed in which a head-mounted display device having a display unit and an imaging unit is used to determine an abnormality of a factory facility based on actual image information from the imaging unit, and an AR (augmented reality) image including maintenance information of the factory facility causing an abnormality is superimposed on an actual image and displayed on the display unit (for example, refer to Japanese Unexamined Patent Application, Publication No. 2018-181232).

Patent Document 1: Japanese Unexamined Patent Application, Publication No. H10-105219
Patent Document 2: Japanese Unexamined Patent Application, Publication No. 2018-181232

SUMMARY OF THE INVENTION

When monitoring equipment including a robot, it is common practice to display I/O signal information transmitted and received by one or a plurality of monitoring target portions of the equipment as confirmation targets of the operating status at a certain point in time. It should be noted that, in the present specification, the I/O signal information refers to a single I/O signal or a plurality of I/O signals of a specific group, or information represented by the single I/O signal or the plurality of I/O signals of the specific group. When such I/O signal information is displayed, it is desirable for the monitoring target portion and the I/O signal information to be displayed in association with each other in the display screen. However, a technique for automatically performing such association is not shown in any of the above-mentioned patent documents.

Therefore, it has been desired, when monitoring a facility including a robot, for a monitoring target portion and I/O signal information to be automatically associated with each other and displayed on a display screen.

An aspect of an I/O signal information display system of the present disclosure relates to an I/O signal information display system including: a display device configured to display an augmented reality image; an imaging device configured to acquire an actual photographed image with a portion including at least any robot of a monitoring target facility including at least one robot as an imaging field of view; a robot identification unit configured to identify the robot of the actual photographed image acquired by the imaging device and to be displayed by the display device; an I/O signal information acquisition unit configured to acquire I/O signal information relating to the robot identified by the robot identification unit; an object identification unit configured to identify an object as a target of the I/O signal information based on a correlation between a change in the actual photographed image displayed on the display device and a change in the I/O signal information; and a display control unit configured to cause the display device to display an augmented reality image in a display form in which an image of the I/O signal information has a specific relationship with an image of the object identified by the object identification unit, in which the object in the monitoring object facility and the I/O signal information are automatically associated with each other and displayed on a display device.

According to one aspect, an object related to a portion including any robot in a monitoring target facility including at least one robot and I/O signal information corresponding to the object are automatically associated with each other and displayed on a display device.

BRIEF DESCRIPTION OF THE DRAWINGS

FIG. 4 is a flowchart showing processing in the data processing unit in the AR device of the I/O signal information display system of FIG. 1;
FIG. 5 is a diagram showing a display example in a display device of the I/O signal information display system of FIG. 1.

DETAILED DESCRIPTION OF THE INVENTION

Figure 1:
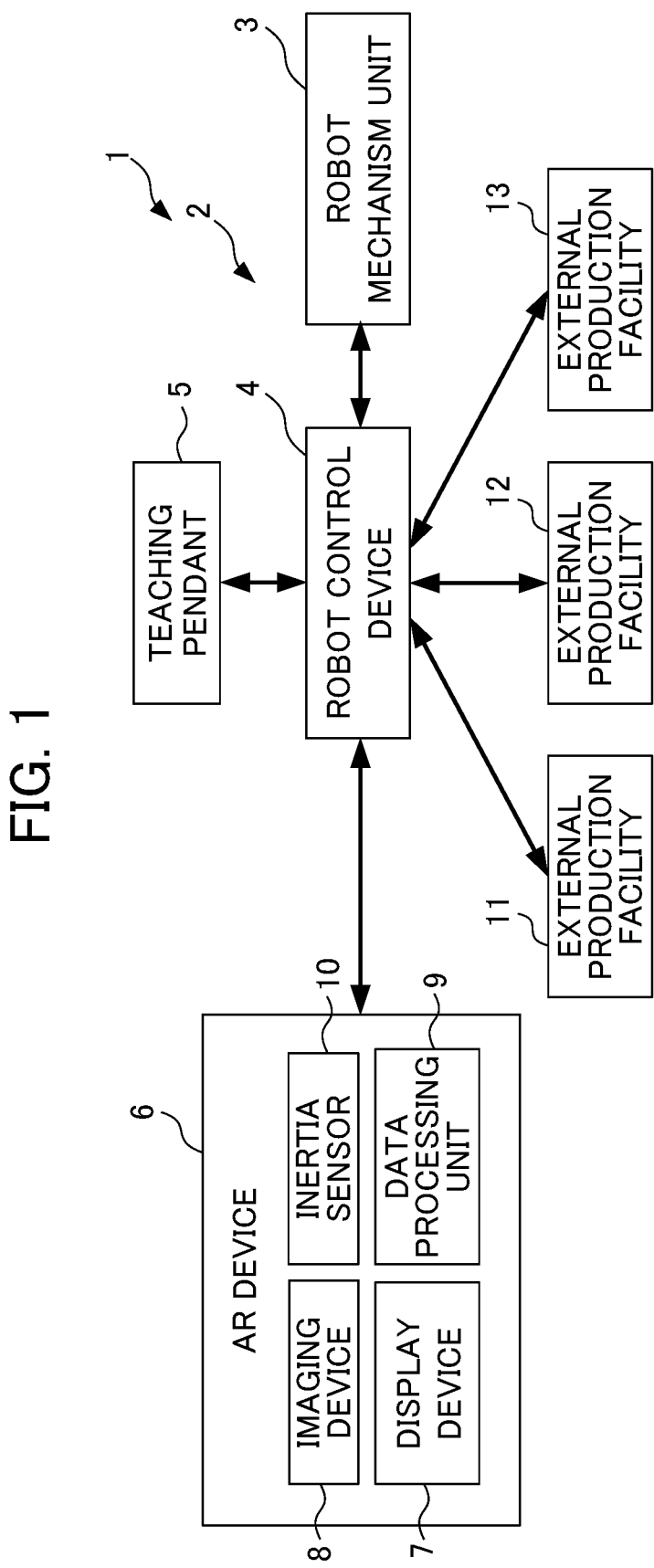
FIG. 1 is a block diagram showing a portion of a monitoring target facility including an I/O signal information display system of the present disclosure.

FIG. 1 is a block diagram showing a portion of a monitoring target facility including an I/O signal information display system of the present disclosure. In FIG. 1, a facility 1 is a production facility configured to include at least one robot 2. The robot 2 is configured to include a robot mechanism unit 3, a robot control device 4, and a teaching pendant 5. The robot mechanism unit 3 is, for example, a six-axis articulated robot arm. However, the present invention is not limited thereto. The robot control device 4 controls the robot mechanism unit 3 based on the information taught by the user operating the teaching pendant 5.

An AR device 6 for use in monitoring the facility 1 is connected wirelessly or in a wired manner to the robot control device 4. The AR device 6 is configured to include a display device 7, an imaging device 8, a data processing unit 9, and an inertia sensor 10. The display device 7 includes a display unit such as a liquid crystal monitor capable of displaying an augmented reality image (hereinafter, referred to as AR image as necessary). The imaging device 8 acquires a photographed image with a portion including at least any robot of the monitoring target facility including at least one robot as an imaging field of view. The data processing unit 9 is constituted by, for example, a computer and, as will be described later, executes the association between a specific object and an I/O signal corresponding thereto, and displays an AR image in which an image of an I/O signal is superimposed on an actual photographed image of the object on the display device 7. The inertia sensor 10 detects the position and posture (i.e., the position and posture of the use's head) of the AR device 6 configured as a head-mounted display, and acquires information representing the range of the user's field of view. The imaging device 8 acquires an actual photographed image according to the information representing the field of view range of the user acquired by the inertia sensor 10. The field of view image corresponding to the information representing the visual field range of the user is displayed on the display device 7. The field of view image is an actual photographed image by the imaging device 8 or the AR image described above.

A plurality of kinds of forms of external production facilities 11, 12, 13 is connected to the robot control device 4, and transmits and receives I/O signals between the robot control device 4. The external production facilities 11, 12, and 13 are specifically a small machining center, a hand as an end effector, a conveyor for transporting articles, or a positioner for use in positioning and supporting a workpiece. In the small machining center, the opening and closing of the door of the cover is expressed by the I/O signal. With the hand as an end effector, the opening and closing of the hand is represented by the I/O signal. On the conveyor, the arrival or passage of an article at a predetermined position is represented by the I/O signal. With the positioner, the position and posture of the workpiece are represented by the I/O signal. As described above, the external production facilities 11, 12, and 13 in which specific examples are enumerated are "objects" corresponding to the I/O signals, respectively, when viewed from the I/O signal side.

Figure 2:
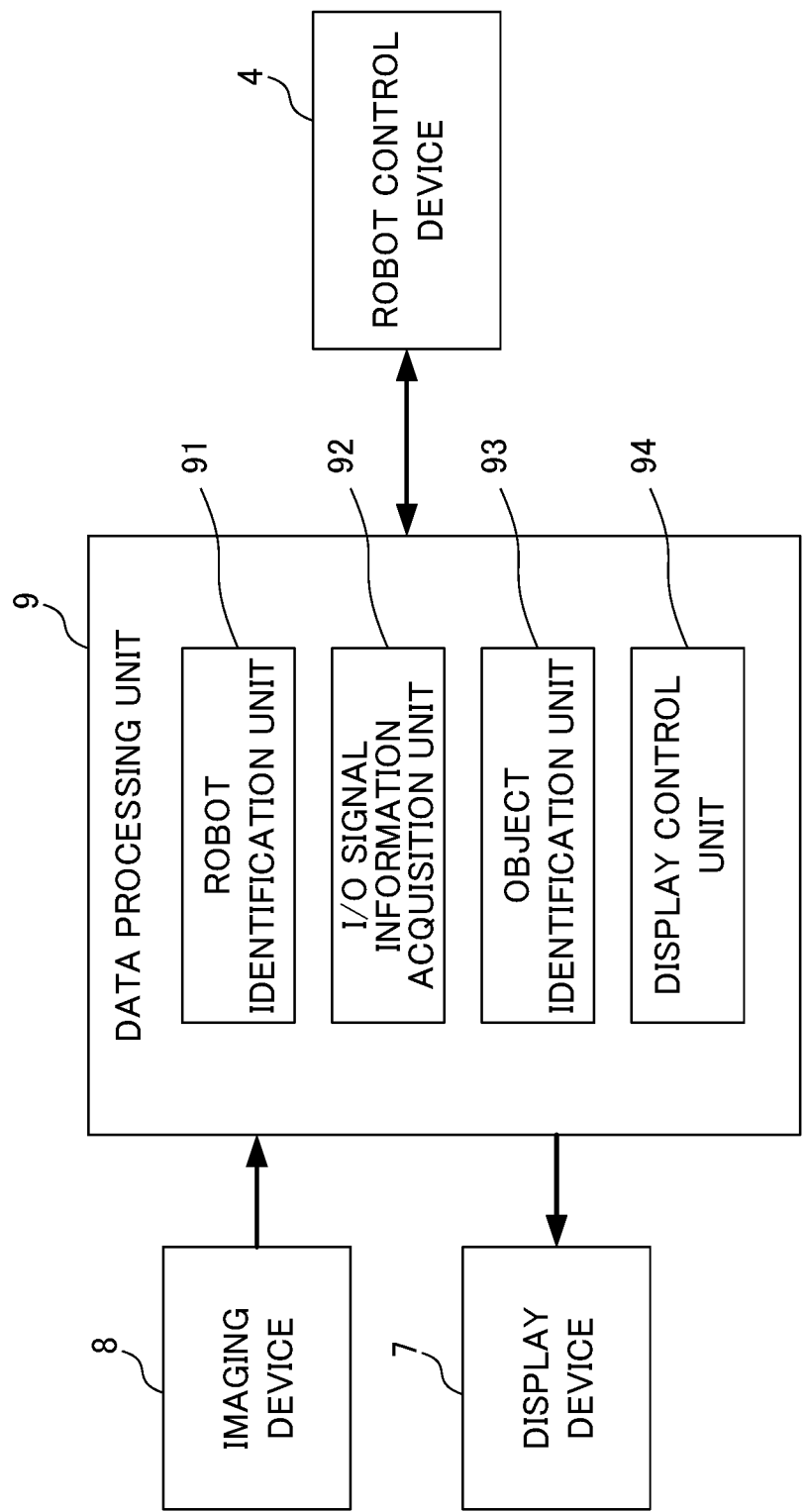
FIG. 2 is a functional block diagram showing a data processing unit in an AR device in the I/O signal information display system of FIG. 1.

Next, the functional configuration of the data processing unit 9 in the AR device 6 of FIG. 1 will be described with reference to the functional block diagram of FIG. 2. The data processing unit 9 receives actual photographed image information from the imaging device 8 in the AR device 6, and outputs the display image data to the display device 7. Furthermore, the data processing unit 9 transmits to and receives from the robot control device 4 the predetermined control signal and I/O signals. The data processing unit 9 is a computer configured to include functional units of a robot identification unit 91, an I/O signal information acquisition unit 92, an object identification unit 93, and a display control unit 94. These functional units are realized by cooperation between the hardware resources of the computer and predetermined software resources.

The robot identification unit 91 identifies the robot of the actual photographed image acquired by the imaging device 8 to be displayed by the display device 7 based on the data supplied from the robot control device 4. The I/O signal information acquisition unit 92 acquires I/O signal information related to the robot identified by the robot identification unit 91. The object identification unit 93 identifies the object as a target of the I/O signal information based on the correlation between the change in the actual photographed image displayed on the display device 7 and the change of the I/O signal information. The display control unit 94 causes the display device 7 to display an AR image in a display form in which the image of the I/O signal information has a specific relationship with the image of the object identified by the object identification unit 93.

Next, the operation of the I/O signal information display system 1 will be described with reference to the sequence diagram of FIG. 3.

The teaching pendant 5 accepts an operation of a display mode setting, which is an operation from an operator (user) setting a display form of the AR image (Step S1). The teaching pendant 5 generates a "display mode instruction" which is command information corresponding to the display mode that is set. The information of the "display mode instruction" includes information indicating which robot in the AR image it is (for example, what unit the robot is) and information designating the display form. The display form is, for example, a form in which the image of the I/O signal information is adjacent to the image of the object, a display format of a mode in which the image of the I/O signal information is superimposed on the image of the object, or a display position of the I/O signal information in the screen. The teaching pendant 5 provides the "display mode instruction" to the robot control device 4.

The robot control device 4 receives the "display mode instruction", and generates "display mode information" which can be recognized by the data processing unit 9 of the AR device 6. That is, the "display mode information" includes information for identifying the display form of the AR image and the robot included in the "display mode instruction". The robot control device 4 extracts "I/O signal information" of a plurality of objects related to the identified robot. The robot control device 4 generates the "display mode information", further performs processing of extracting the "I/O signal information" (Step S2), and supplies the "display mode information" and "I/O signal information" to the data processing unit 9.

The imaging device 8 performs an imaging operation of a moving image which is an image of a time series over a required period for the user's field of view range determined from the position and the posture of the head of the user acquired by the inertia sensor 10 of the AR device 6. The field of view of the user includes a robot to which attention is paid, and this robot inevitably matches the robot identified by the "display mode information". The imaging device 8 acquires "actual photographed image data" which is time-series image data (Step S3). The imaging device 8 supplies the acquired "actual photographed image data" to the data processing unit 9.

The data processing unit 9 executes display image data generation processing, which will be described later, based on the "display mode information" and the "I/O signal information" supplied from the robot control device 4, and the "actual photographed image data" supplied from the imaging device 8 (Step S4). The data processing unit 9 generates "display image data" representing an AR image to be displayed on the display unit of the display device 7 by the display image data generation processing, and supplies this data to the display device 7.

The display device 7 displays the AR image on its own display unit based on the "display image data" supplied from the data processing unit 9 (Step S5).

Next, display image data generation processing executed by the data processing unit 9 will be described with reference to the flowchart of FIG. 4.

The data processing unit 9 acquires the "display mode information" and "I/O signal information" from the robot control device 4, and acquires the "actual photographed image data" from the imaging device 8 (Step S11). As described above, the "display mode information" includes information identifying the robot, and this information is identified by the robot identification unit 91 of the data processing unit 9 (FIG. 2) for identifying the robot. The acquisition of the "I/O signal information" is performed by the I/O signal information acquisition unit 92 (FIG. 2) of the data processing unit 9.

The data processing unit 9 detects a moving object among the objects in the imaging field of view by comparing two pieces of image data acquired at different timings based on the "actual photographed image data" supplied from the imaging device 8 (Step S12).

Next, the data processing unit 9 performs the association between the object and the I/O signal based on the correlation of the simultaneity and the like between the movement of the object detected in Step S11 and the change of the I/O signal in the I/O signal information acquired in Step S12 (Step S13). For example, if the timing of the opening/closing operation of the hand of the robot as an object and the timing of the change in on/off of the I/O signal coincide, this hand and the I/O signal are associated with each other. The processing in Steps S12 and S13 is executed by the object identification unit 93 (FIG. 2) of the data processing unit 9.

Next, the data processing unit 9 generates display image data based on the object data and the I/O signal data representing the object and the I/O signal respectively representing the object and the I/O signal having an association with each other that has been fixed in the processing in Step S13 (Step S14). The display image data is image data representing an AR image in which an additional image (I/O signal waveform) based on the I/O signal data is superimposed on an actual photographed image based on the object data. The processing in Step S14 is executed by the display control unit 94 of the data processing unit 9 (FIG. 2).

The data processing unit 9 supplies the display image data generated by the processing in Step 314 in the display control unit 94 to the display device 7. The display device 7 displays the AR image in which an image of an I/O signal waveform corresponding thereto is superimposed on an actual photographed image of an object on the display unit based on the supplied display image data.

Next, a display example of the display device 7 of the AR device 6 will be described with reference to FIG. 5.

Figure 3:
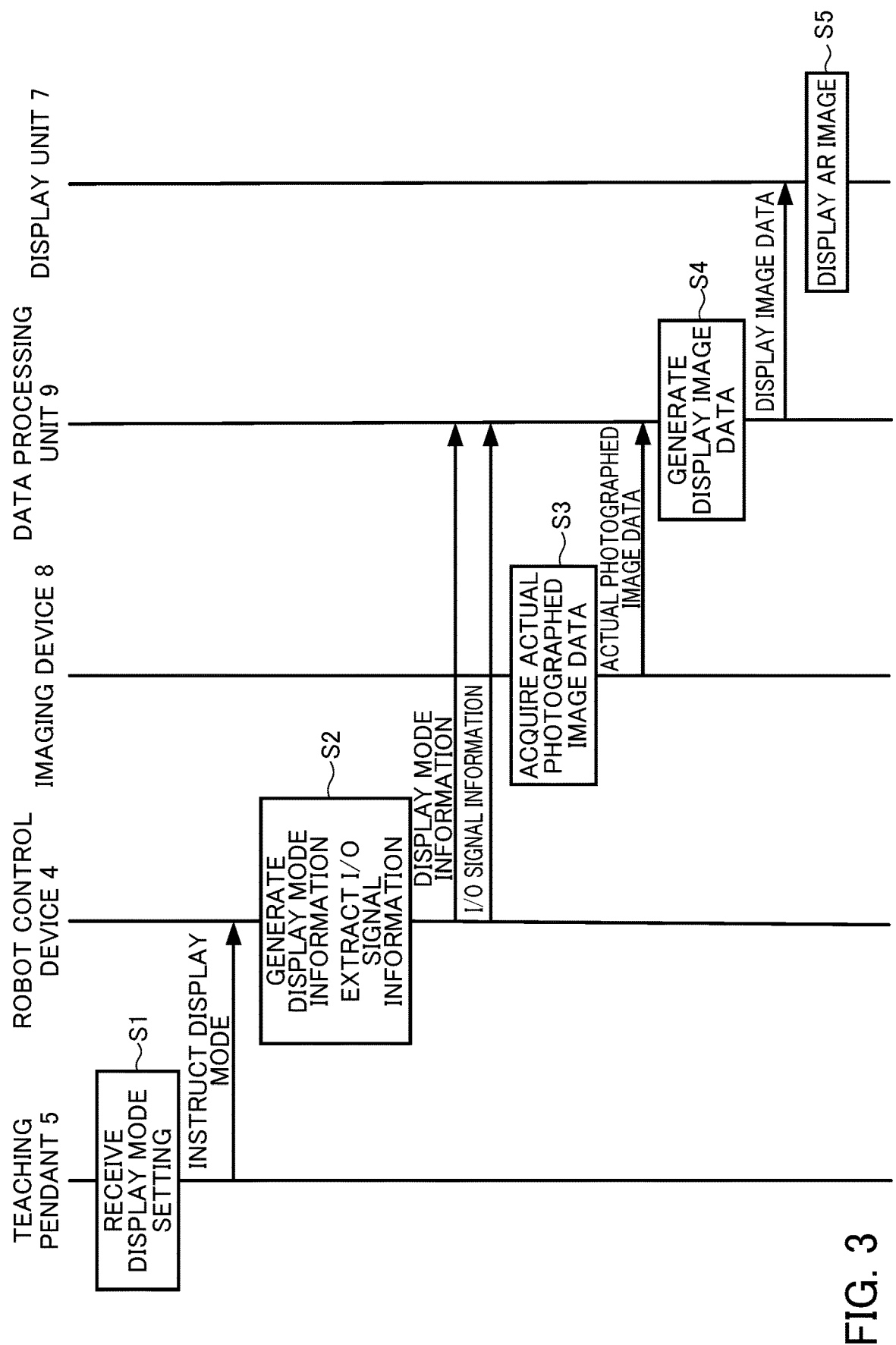
FIG. 3 is a sequence diagram showing operation of the I/O signal information display system of FIG. 1.

FIG. 5 shows a display image (AR image) on the display unit of the display device 7 at a certain point in time by the display mode set by the teaching pendant 5 (FIGS. 1 and 3). In the case of FIG. 5, a state in which a first conveyor 14 and a second conveyor 15 for transferring workpieces are installed in parallel at intervals is visually recognized. Between the first conveyor 14 and the second conveyor 15, a robot 16 is installed. The robot 16 has a hand 16*a* as an end effector. A state is visually recognized in which a first workpiece passing sensor 17 for detecting the passage of the workpiece facing the first conveyor 14 is provided. A state is visually recognized in which a second workpiece passing sensor 18 for detecting the passage of the workpiece facing the second conveyor 15 is provided. Workpieces 19 and 20 are conveyed on the conveying belt of the first conveyor 14. Workpieces 21 and 22 are conveyed on the conveying belt of the second conveyor 15. The robot 16 opens and closes the hand 16*a* when performing an operation of transferring the workpiece on the conveyor belt of the first conveyor 14 on the conveying belt of the second conveyor 15 by the hand 16*a*. The first conveyor 14, the second conveyor 15, the robot 16, the hand 16*a*, the first workpiece passing sensor 17, the second workpiece passing sensor 18, the workpieces 19, 20, 21, and 22 are taken in an actual photographed image by the imaging device 8 (FIG. 1). The I/O signal information image 23, which is an image of a waveform representing a change in the time series of the I/O signal, is superimposed on the actual photographed image, and is displayed as an AR image on the display unit of the display device 7. The I/O signal information image 23 includes an image of the waveforms representing the change in time series of an I/O signal DI1 which is a detection signal of the first workpiece passing sensor 17, an I/O signal DI2 which is a detection signal of the second workpiece passing sensor 18, and an I/O signal DO1 representing the opening and closing of the hand 16*a*.

Each component in FIG. 5 corresponds to each component in FIG. 1 as follows. That is, the first conveyor 14 of FIG. 5 (the first workpiece passing sensor 17) corresponds to the external production facility 11 of FIG. 1. The second conveyor 15 of FIG. 5 (the second workpiece passing sensor 18) corresponds to the external production facility 12 of FIG. 1. The hand 16*a* of FIG. 5 corresponds to the external production facility 13 of FIG. 1.

Next, other display examples in the display device 7 of the AR device 6 will be described with reference to FIG. 6A and FIG. 6B.

Figure 6A:
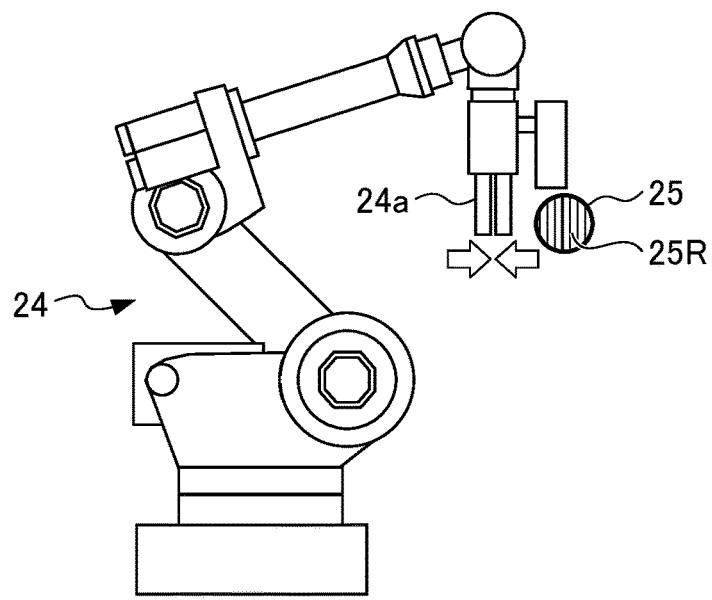
FIG. 6A is a diagram showing a case of another display example in the display device of the I/O signal information display system of FIG. 1.
Figure 6B:
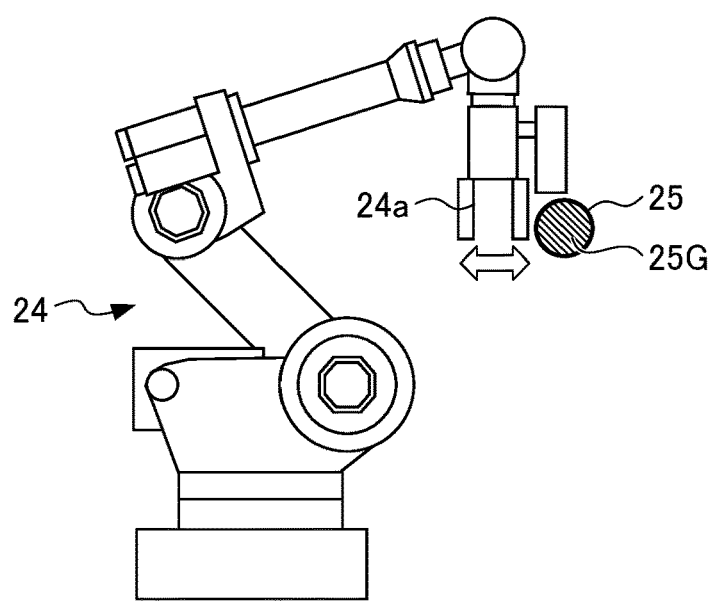
FIG. 6B is a diagram showing another case of another display example in the display device of the I/O signal information display system of FIG. 1.

FIGS. 6A and 6B represent the display images (AR images) on the display unit of the display device 7 at a certain point in time by the display mode set by the teaching pendant 5 (FIGS. 1 and 3). In FIGS. 6A and 6B, the robot 24 and the hand 24*a* are taken in an actual photographed image by the imaging device 8 (FIG. 1). A marker 25, which is a circular pattern, is superimposed at a position near the hand 24*a* on the actual photographed image, and is displayed as an AR image on the display unit of the display device 7.

In the AR images of FIGS. 6A and 6B, the open/closed state of the hand 24*a* of the robot 24 is displayed by the display color of the marker 25. In the case of FIG. 6A, the hand 24*a* of the robot 24 is "closed", and the display color of the marker 25 corresponding to this is "red" 25R. In the case of FIG. 6B, the hand 24*a* of the robot 24 is "open", and the display color of the marker 25 corresponding to this is "green" 25G.

The operation and effects of the I/O signal information display system of the present disclosure, which are described with reference to FIGS. 1 to 6B, are summarized below.

(1) An I/O signal information display system according to the present disclosure includes: a display device 7 configured to display an AR image; an imaging device 8 configured to acquire an actual photographed image with a portion including at least any robot 2 of a monitoring target facility 1 including at least one robot 2 as an imaging field of view; a robot identification unit 91 configured to identify the robot 2 of the actual photographed image and to be displayed by the display device 7; an I/O signal information acquisition unit 92 configured to acquire I/O signal information relating to the robot 2 identified by the robot identification unit 91; an object identification unit 93 configured to identify an object as a target of the I/O signal information based on a correlation between a change in the actual photographed image displayed on the display device 7 and a change in the I/O signal information; and a display control unit 94 configured to cause the display device to display an AR image in a display form in which an image of the I/O signal information has a specific relationship with an image of the object identified by the object identification unit 93.

In the I/O signal information display system of the above (1), the actual photographed image data representing the actual photographed image of the robot identified by the robot identification unit 91 in the imaging field of view of the imaging device 8, and the I/O signal information relating to the robot acquired by the I/O signal information acquisition unit 92 are supplied to the object identification unit 93. The object identification unit 93 identifies the object based on the correlation between the change in the actual photographed image displayed on the display device 7 and the change in the I/O signal information based on the supplied actual photographed image data. The display control unit 94 causes the display device 7 to display an AR image in a display form in which the image 23 of the I/O signal information has a specific relationship with the image of the identified object. That is, the association between the object and the I/O signal is automatically identified, and the AR image in which the image 23 of the I/O signal information is superimposed on the image of the associated object is displayed on the display device 7. Therefore, a person monitoring the display can appropriately monitor the state of the object and the I/O signal by the AR image of the abovementioned display form displayed on the display device 7.

(2) In the I/O signal information display system according to an aspect of the present disclosure, the object identification unit 93 identifies an object based on simultaneity between the change in the actual photographed image and the change in the I/O signal information.

In the I/O signal information display system of the above (2), the object identification unit 93 identifies the object by finding a combination in which, for example, the opening and closing operation of the robot hands 16*a* and 24*a*, which is a change in an actual photographed image, and the change in on/off of the I/O signal, which is, for example, a change in the I/O signal information, temporally match with each other. Therefore, the object can be identified relatively easily, and the associating relationship between the I/O signal information and the object can be reliably determined.

(3) In the I/O signal information display system according to an aspect of the present disclosure, the display control unit 94 causes the display device 7 to display, as the display form, any of: a form in which an image of the I/O signal information is adjacent to an image of the object; a form in which an image of the I/O signal information is superimposed on the image of the object; a form in which a numerical value of the I/O signal information is displayed in text together with the image of the object; a form in which a pattern having brightness, hue, or saturation (color saturation) according to the numerical value of the I/O signal information is displayed together with the image of the object; a form in which a graph according to the numerical value of the I/O signal information is displayed together with the image of the object; or a form in which the image of the object is altered according to the numerical value of the I/O signal information.

In the I/O signal information display system of the above (3), the image of the object and the image of the I/O signal information can be displayed on the display device 7 in a form well suited to the monitoring purpose, and thus accurate monitoring can be performed.

It should be noted that the present disclosure is not limited to the embodiments described above, and various modifications and changes can be made and implemented. For example, in the above-described embodiment, the AR device is configured as a head-mounted display; however, it may also be configured as a monitoring panel having the same data processing function and display function as the head-mounted display. In addition, modifications and improvements within a scope which can achieve the object of the present disclosure are also encompassed by the present disclosure.

EXPLANATION OF REFERENCE NUMERALS

1 facility
2, 16, 24 robot
3 robot mechanism unit
4 robot control device
5 teaching pendant
6 AR device
7 display unit
8 imaging device
9 data processing unit
10 inertia sensor
11, 12, 13 external production facility
14 first conveyor
15 second conveyor
16*a*, 24*a* hand
17 first workpiece passing sensor
18 second workpiece passing sensor
19, 20, 21, 22 workpiece
23 I/O signal information image
25 marker
25R "red" (display color)
25G "green" (display color)
91 robot position identification unit
92 I/O signal information acquisition unit
93 object identification unit
94 display control unit

What is claimed is:

1. An I/O signal information display system comprising:
a display device configured to display an augmented reality image;
an imaging device configured to acquire an actual photographed image with a portion including at least any robot of a monitoring target facility including at least one robot as an imaging field of view; and
a processor, wherein the processor is configured to:
identify the robot of the actual photographed image acquired by the imaging device and to be displayed by the display device;
acquire a plurality of I/O signals relating to the identified robot from a plurality of locations, at least one of the plurality of I/O signals being from a sensor;
identify an object as a target of one of the plurality of I/O signals based on a correlation between a change in the actual photographed image displayed on the display device that corresponds to movement of the object and a change in the one I/O signal of the plurality of I/O signals; and
cause the display device to display an augmented reality image in a display form in which an image of the one I/O signal of the plurality of I/O signals includes the change in the I/O signal that has a specific relationship with an image of the identified object.

2. The I/O signal information display system according to claim 1, wherein the processor identifies the object based on simultaneity between the change in the actual photographed image and the change in the one I/O signal of the plurality of I/O signals.

3. The I/O signal information display system according to claim 1, wherein the processor causes the display device to display, as the display form, any of: a form in which an image of the one I/O signal of the plurality of I/O signals is adjacent to an image of the object; a form in which an image of the one I/O signal of the plurality of I/O signals is superimposed on the image of the object; a form in which a numerical value of the one of the plurality of I/O signals is displayed in text together with the image of the object; a form in which a pattern having brightness, hue, or saturation according to the numerical value of the one of the plurality of I/O signals is displayed together with the image of the object; a form in which a graph according to the numerical value of the one of the plurality of I/O signals is displayed together with the image of the object; or a form in which the image of the object is altered according to the numerical value of the one of the plurality of I/O signals.

4. The I/O signal information display system according to claim 1, wherein the processor displays an image of an I/O signal waveform as the image of the one I/O signal of the plurality of I/O signals.

5. The I/O signal information display system according to claim 1, wherein the object as the target of the one I/O signal of the plurality of I/O signals is one of a plurality of objects in the actual photographed image.

6. The I/O signal information display system according to claim 5, wherein the plurality of objects are moving.

\* \* \* \* \*